United States Patent
Liu et al.

(10) Patent No.: US 8,538,661 B2
(45) Date of Patent: Sep. 17, 2013

(54) EXHAUST TREATMENT METHODS AND SYSTEMS

(75) Inventors: Zhiping Steven Liu, Canton, MI (US); Eugene V. Gonze, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 714 days.

(21) Appl. No.: 12/826,243

(22) Filed: Jun. 29, 2010

(65) Prior Publication Data

US 2011/0320103 A1    Dec. 29, 2011

(51) Int. Cl.
*F02D 45/00* (2006.01)
*G06F 17/18* (2006.01)

(52) U.S. Cl.
USPC .............................................. 701/102; 60/274

(58) Field of Classification Search
USPC ................... 701/102, 114, 115; 60/274, 286, 60/297, 301, 303, 311
See application file for complete search history.

(56) References Cited

U.S. PATENT DOCUMENTS

| | | | |
|---|---|---|---|
| 4,558,565 A * | 12/1985 | Kojima et al. ................. | 60/286 |
| 6,947,831 B2 * | 9/2005 | van Nieuwstadt ............ | 701/102 |
| 7,171,802 B2 | 2/2007 | Inoue et al. | |
| 7,677,029 B2 | 3/2010 | Matsuno et al. | |
| 7,721,528 B2 * | 5/2010 | Odajima et al. ................. | 60/277 |
| 7,975,469 B2 * | 7/2011 | Gonze et al. ..................... | 60/274 |
| 2004/0200271 A1 | 10/2004 | Van Nieuwstadt | |
| 2006/0196167 A1 | 9/2006 | Odajima et al. | |

FOREIGN PATENT DOCUMENTS

| | | |
|---|---|---|
| CN | 1598259 A | 3/2005 |
| CN | 1930383 A | 3/2007 |
| CN | 101440735 A | 5/2009 |
| EP | 2261474 A1 | 12/2010 |
| WO | 2009101667 A1 | 8/2009 |

OTHER PUBLICATIONS

German Office Action for Application No. 102011105549.9 dated Dec. 3, 2012, 8 pages.
Chinese Office Action for Application No. 201110178441.7 dated Mar. 25, 2013; 7 pages.

* cited by examiner

*Primary Examiner* — Hieu T Vo
(74) *Attorney, Agent, or Firm* — Cantor Colburn LLP

(57) ABSTRACT

A method of evaluating a particulate filter of an exhaust treatment system is provided. The method includes: selectively enabling at least one of data collection and resistance evaluation based on a particulate matter level in the particulate filter; when data collection is enabled, computing a particulate filter resistance based on a linear regression model; and when resistance evaluation is enabled, evaluating an efficiency of the particulate filter based on the particulate filter resistance.

20 Claims, 4 Drawing Sheets

US 8,538,661 B2

EXHAUST TREATMENT METHODS AND SYSTEMS

FIELD OF THE INVENTION

Exemplary embodiments of the present disclosure relate to methods and systems for exhaust systems, and more particularly to methods and systems for evaluating a particulate filter of an exhaust system.

BACKGROUND OF THE INVENTION

Exhaust gas emitted from an internal combustion engine, for example, a diesel engine, is a heterogeneous mixture that contains gaseous emissions such as carbon monoxide (CO), unburned hydrocarbons (HC) and oxides of nitrogen (NOx) as well as condensed phase materials (liquids and solids) that constitute particulate matter. Particulate filters are provided to filter the materials from the exhaust. When a particulate filter becomes full of particulates, the particulate filter is regenerated. If temperatures are too high during the regeneration process, the particulate filter may crack or melt. Thus, it is desirable to evaluate the efficiency of the particulate filter from time to time, to determine if the particulate filter is damaged.

SUMMARY

In one exemplary embodiment, a method of evaluating a particulate filter of an exhaust treatment system is provided. The method includes: selectively enabling at least one of data collection and resistance evaluation based on a particulate matter level in the particulate filter; when data collection is enabled, computing a particulate filter resistance based on a linear regression model; and when resistance evaluation is enabled, evaluating an efficiency of the particulate filter based on the particulate filter resistance.

The above features and advantages and other features and advantages of the present invention are readily apparent from the following detailed description of carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
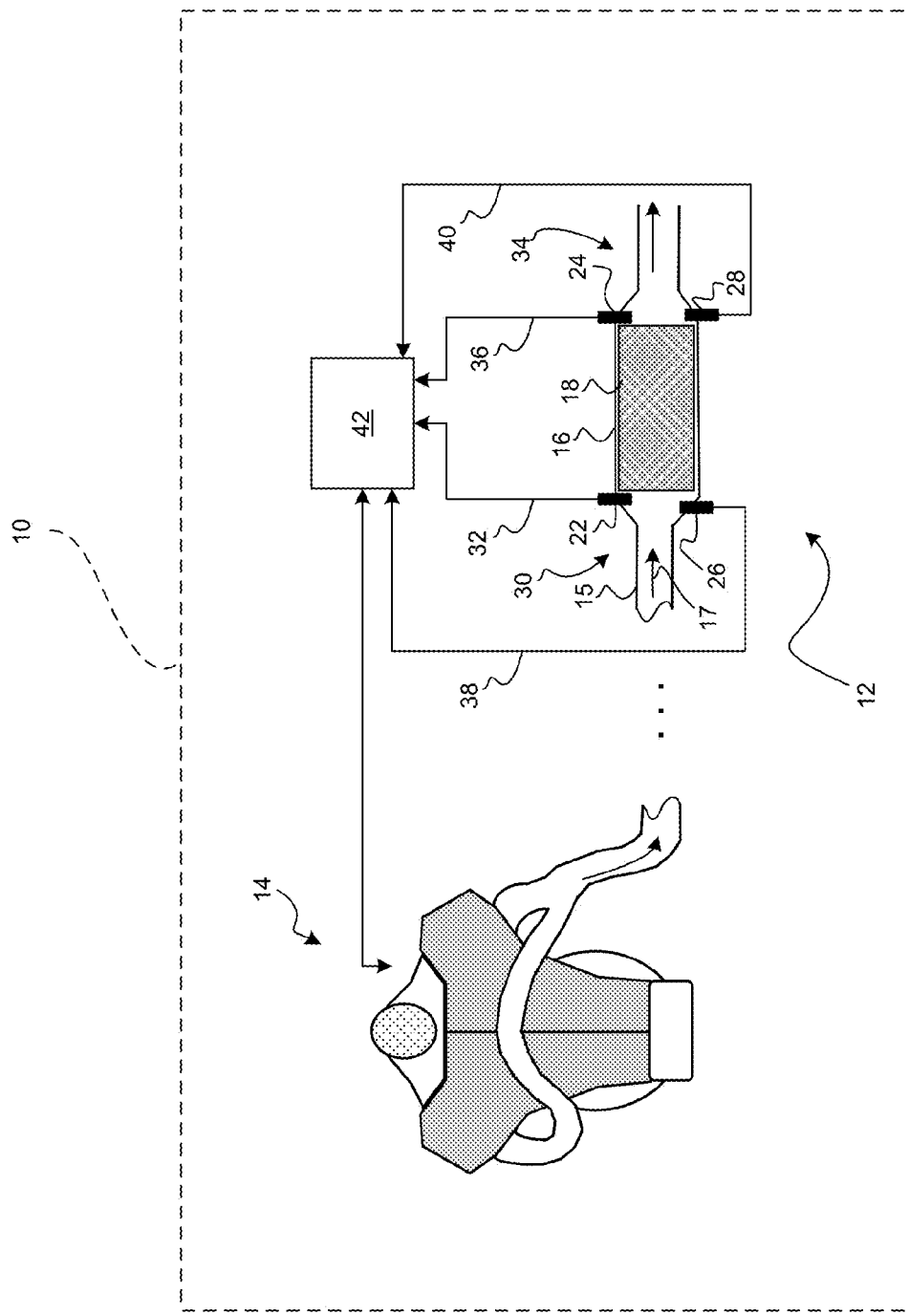
FIG. 1 is a schematic illustration of an exhaust system in accordance with an exemplary embodiment.

The following description is merely exemplary in nature and is not intended to limit the present disclosure, application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a vehicle 10 that includes an exhaust treatment system shown generally at 12. The exhaust treatment system 12 reduces exhaust gas constituents produced by an internal combustion engine system shown generally at 14. As can be appreciated, the exhaust treatment system 12 described herein can be implemented in various engine systems 14. Such engine systems 14 may include, for example, but are not limited to, diesel engines, gasoline direct injection systems, and homogeneous charge compression ignition engine systems.

As shown in FIG. 1, the exhaust treatment system 12 generally includes one or more exhaust gas conduits 15 that receive exhaust 17 from the engine system 14. The exhaust gas conduits 15 couple one or more exhaust treatment devices to the engine system 14. The exhaust treatment devices include at least a particulate filter (PF) 16. Additionally, the exhaust treatment devices may include, for example, but are not limited to, one or more oxidation catalysts (not shown) and/or one or more selective catalytic reduction devices (not shown).

The PF 16 operates to filter the exhaust 17 of carbon and other particulates. As can be appreciated, the PF 16 can be of various particulate filters known in the art. In various embodiments, the PF 16 includes a filter 18 that may be constructed using a wall flow monolith filter or other devices, such as, for example, wound or packed fiber filters, open cell foams, sintered metal fibers, etc. The filter 18 may be wrapped in an intumescent mat that expands when heated to secure and insulate the substrate, and may be packaged in the rigid shell or canister.

The vehicle 10 further includes various sensors 22-28 that detect and measure observable conditions of the exhaust treatment system 12 and/or of the engine system 14. The sensors 22-28 generate sensor signals based on the observable conditions. In various embodiments, the sensors 22, 24 are pressure sensors. The first pressure sensor 22 senses a pressure of the exhaust 17 at or near an inlet shown generally at 30 of the PF 16 and generates an exhaust pressure signal 32 based thereon. A second pressure sensor 24 senses a pressure of the exhaust 17 at or near an outlet shown generally at 34 of the PF 16 and generates an exhaust pressure signal 36 based thereon. In various other embodiments, the sensors 22, 24 are a single pressure sensor with a first pressure being sensed at or near the inlet 30 of the PF 16 and a reference pressure being sensed at or near the outlet 34 of the PF 16.

In various embodiments, the sensors 26, 28 are temperature sensors. A first temperature sensor 26 senses a temperature of the exhaust 17 at or near the inlet 30 of the PF 16 and generates a first temperature signal 38 based thereon. A second temperature sensor 28 senses a temperature of the exhaust 17 at or near the outlet 34 of the PF 16 and generates a second temperature signal 40 based thereon.

A control module 42 receives the signals 32, 36, 38, 40 and controls the engine system 14 and/or the exhaust treatment system 12 to regenerate the PF 16 according to regeneration methods known in the art. In various embodiments, the control module 42 further evaluates the efficiency of the PF 16 based on sensed or modeled data and further based on the PF evaluation methods and systems described herein. In various embodiments, the control module 42 receives the signals 32, 36, 38, 40 and determines an efficiency of the PF 16 by computing a flow resistance. The control module 42 computes the flow resistance based on a linear regression analysis of the exhaust pressure and exhaust flow. Based on the efficiency of the PF 16, the control module 42 diagnoses the PF 16.

Figure 2:
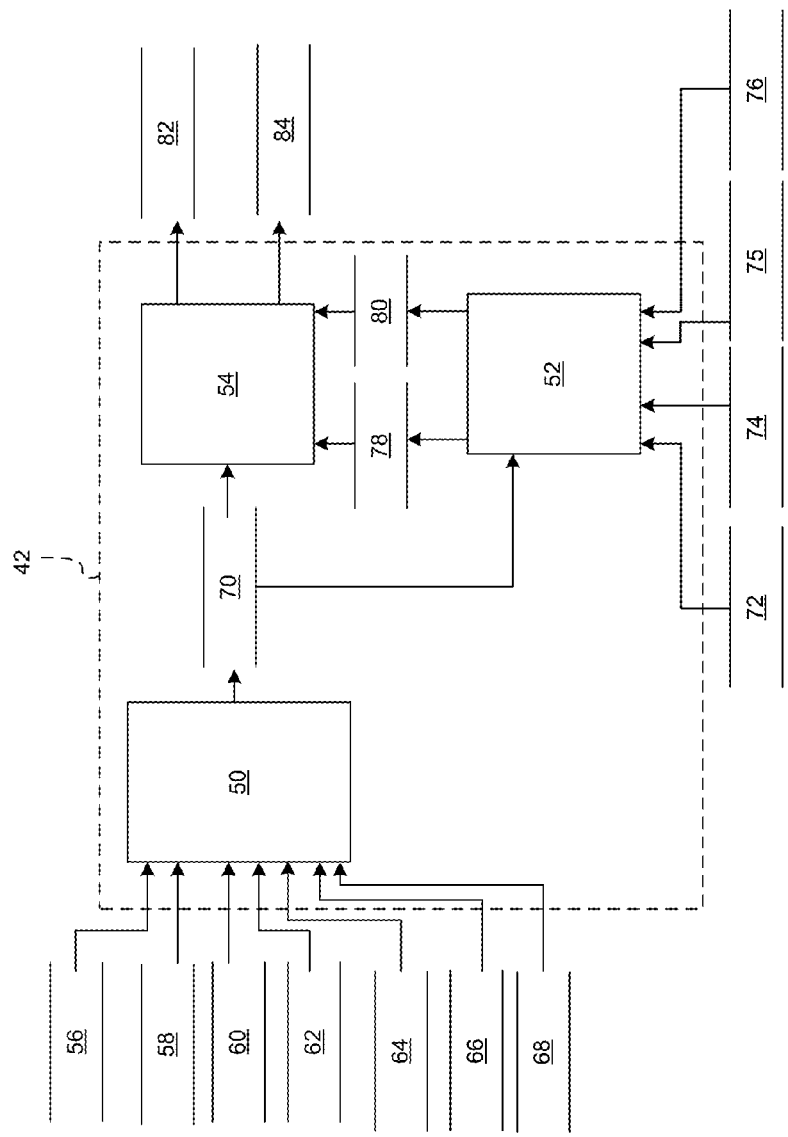
FIG. 2 is a dataflow diagram illustrating a particulate filter evaluation system in accordance with an exemplary embodiment.

Referring now to FIG. 2, a dataflow diagram illustrates various embodiments of a PF evaluation system that may be embedded within the control module 42 of FIG. 1. Various embodiments of PF evaluation systems according to the present disclosure may include any number of sub-modules embedded within the control module 42. As can be appreciated, the sub-modules shown in FIG. 2 may be combined and/or further partitioned to similarly evaluate the efficiency of the PF 16 (FIG. 1). Inputs to the control module 42 may be sensed from the engine system 14 (FIG. 1), received from other control modules (not shown) within the vehicle 10, and/or determined/modeled by other sub-modules (not shown) within the control module 42. In various embodiments, the control module 42 includes an enable module 50, a linear regression module 52, and an evaluation module 54.

The enable module 50 receives input data indicating current operating conditions of the exhaust treatment system 12 (FIG. 1). For example, the input data can include, but is not limited to, regeneration status 56, PF inlet temperature 58, PF outlet temperature 60, mileage 62, exhaust flow 64, time 66, and/or fuel 68. Based on some of the input data, all of the input data, or a combination of the various input data, the enable module 50 determines when the current operating conditions are sufficient to enable either data collection or resistance evaluation, and sets an enable status 70 based thereon. In various embodiments, the enable status 70 can be an enumeration with values indicating not enabled, data collection enabled, and resistance evaluation enabled.

In various embodiments, the enable module 50 sets the enable status 70 to indicate data collection enabled when the regeneration status 56 indicates regeneration is complete, and when properties of the PF 16 (FIG. 1) are relatively stable. The properties can include, but are not limited to temperature and particulate matter accumulation. For example, particulate matter levels or data associated with particulate matter in the PF 16 (FIG. 1) (i.e., exhaust flow 64, mileage 62, time 66, and/or fuel 68) can be evaluated to determine when an accumulation of the particulate matter is relatively stable after regeneration has occurred. For example, when the particulate matter level is within a range (e.g., a range defined by a minimum entry threshold, and a maximum exit threshold), the particulate matter level is said to be stable.

In another example, the PF temperatures 58, 60 can be evaluated to determine when the PF temperature is relatively stable after regeneration has occurred. For example, when a difference in the PF inlet temperature 58 and the PF outlet temperature 60 is within a temperature range (e.g., a range defined by a minimum temperature and a maximum temperature), the PF temperature is said to be stable.

In various embodiments, the enable module 50 sets the enable status 70 to indicate resistance evaluation enabled when the PF properties have exceed stability limits. For example, when the particulate matter level and/or the mileage has exceeded respective thresholds (e.g., the exit criteria have been met) during the data collection stage, the PF properties are said to have exceeded the stability limits.

In various embodiments, the enable module 50 initializes the enable status 70 to indicate not enabled. When the conditions are not satisfied to set the enable status 70 to data collection enabled or resistance evaluation enabled, the enable module 50 sets the enable status 70 to not enabled.

The linear regression module 52 receives as input the enable status 70, and data indicating current operating conditions of the exhaust treatment system 12 (FIG. 1). In various embodiments, the data includes, but is not limited to, inlet exhaust pressure 72, outlet exhaust pressure 74, particulate filter temperature 75, and exhaust flow 76. In various embodiments, the exhaust flow 76 can be a measured or estimated volume of exhaust flow 76 through the exhaust system 12 (FIG. 1). In various embodiments, the particulate filter temperature 75 is the measured temperature at the inlet 30 (FIG. 1) of the PF 16 (FIG. 1).

Figure 3:
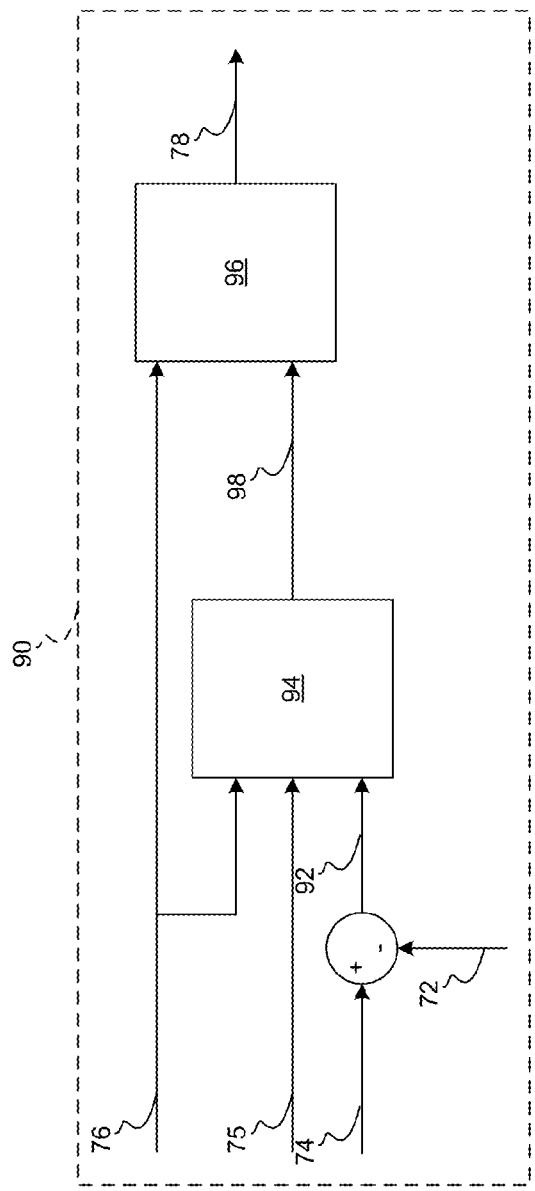
FIG. 3 is a diagram illustrating an exemplary linear regression model of the particulate filter evaluation system in accordance with an exemplary embodiment.

When the enable status 70 indicates that data collection is enabled, the linear regression module 52 utilizes a linear regression model 90 (FIG. 3) to compute a PF resistance 78. For example, as shown in FIG. 3, the linear regression model 90 computes a delta pressure 92 between the inlet exhaust pressure 72 and the outlet exhaust pressure 74 and applies a linear transform function 94 to the delta pressure 92 based on the exhaust flow 76 and particulate filter temperature 75. The linear regression model 90 then applies a Kalman filter function 96 to the linearized delta pressure 98 using the exhaust flow 76 to determine the PF resistance 78 (where the PF resistance 78 is the slope of the line).

With reference back to FIG. 2, in various embodiments, the linear regression module 52 computes the PF resistance 78 when the exhaust flow is within a range (e.g., a range defined by a minimum exhaust flow threshold and a maximum exhaust flow threshold). In various embodiments, the linear regression module 52 can further track a data depth and breadth 80 of the data collected when the exhaust flow 76 is within the range. For example, the exhaust flow range can be segmented into zones, and the exhaust flow data used to compute the PF resistance can be tracked as the data depth and the breadth 80 for each zone.

The evaluation module 54 receives as input the enable status 70, the PF resistance 78, and the data depth and breadth 80. When the enable status 70 indicates resistance evaluation enabled, the evaluation module 54 determines whether sufficient data was captured to evaluate the computed PF resistance 78. For example, the data depth and breadth 80 is compared to a data threshold. If data depth and breadth exceeds the threshold, then sufficient data was captured. The evaluation module 54 then compares the computed PF resistance 78 to a resistance threshold. If the computed PF resistance 78 is less than or equal to the resistance threshold, then the PF 16 (FIG. 1) is determined to be operating in an efficient manner. If the compute PF resistance is greater than a resistance threshold, then the PF 16 (FIG. 1) is determined to be operating in an inefficient manner.

Based on the efficiency determination, the evaluation module 54 can set a diagnostic code 82 and/or generate a notification signal 84. For example, if the inefficiency is determined one or more times for X consecutive times, for X consecutive seconds, or for X out of Y samples, the notification signal 84 may be generated. In various embodiments, the notification signal 84 may be an audio signal that activates an audio system (not shown) of the vehicle 10 (FIG. 1). In various other embodiments, the notification signal 84 may be an indicator signal that activates a warning lamp (not shown) of the vehicle 10 (FIG. 1). In various other embodiments, the notification signal 84 includes the appropriate diagnostic trouble code 82 and can be retrieved by a service tool or transmitted to a remote location via a telematics system (not shown) of the vehicle 10 (FIG. 1).

Figure 4:
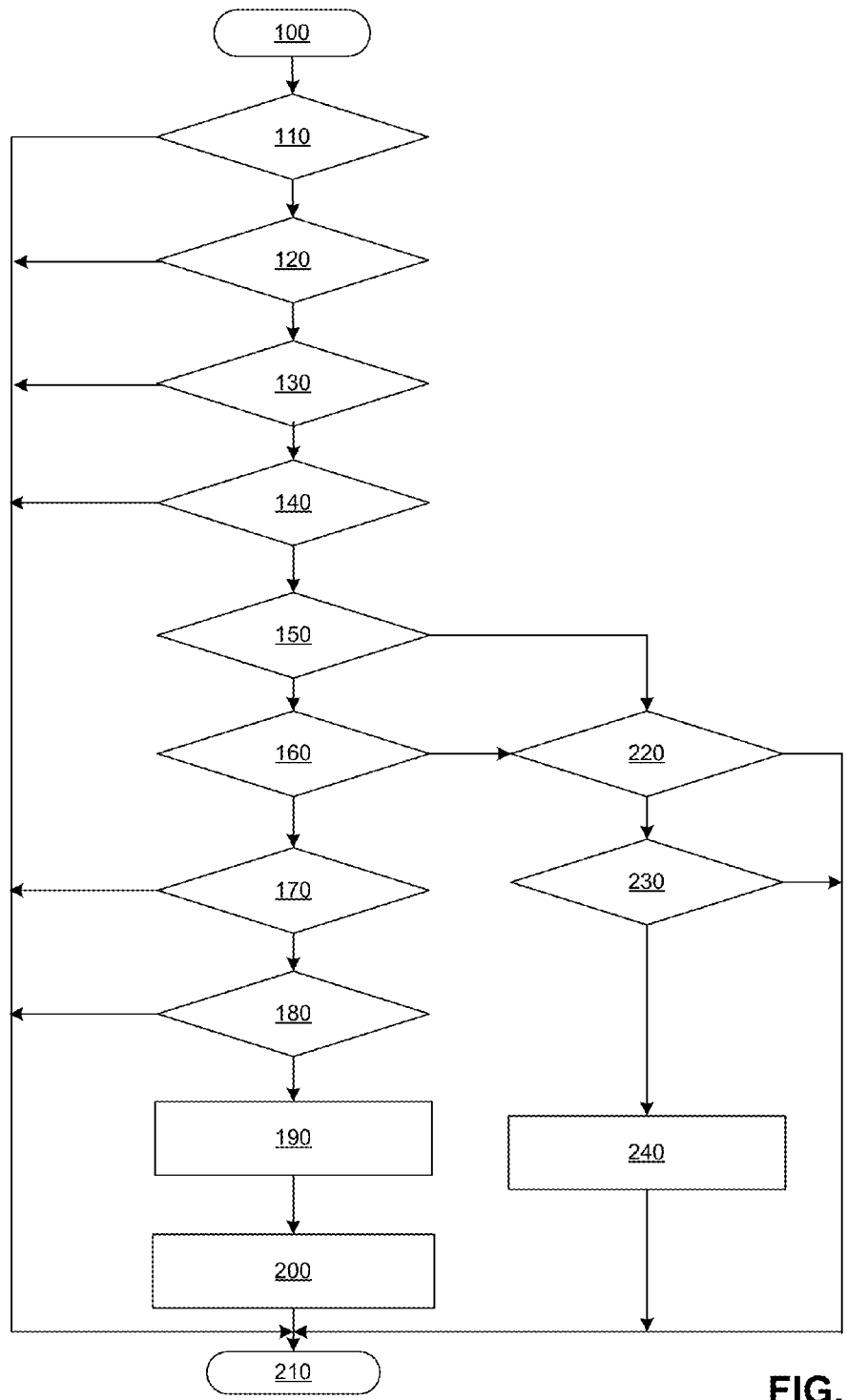
FIG. 4 is a flowchart illustrating a particulate filter evaluation method in accordance with an exemplary embodiment.

Referring now to FIG. 4, and with continued reference to FIGS. 1 and 2, a flowchart illustrates an exhaust treatment control method that can be performed by the control module 42 of FIG. 1 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure.

In various embodiments, the method can be scheduled to run based on predetermined events, and/or run continually (e.g., at predetermined time intervals) during operation of the engine system 14 (as shown in the example of FIG. 4).

In one example, the method may begin at 100. The data collection enable criteria and the resistance evaluation criteria are evaluated at 110 to 170. If the regeneration status 56 indicates that regeneration is complete at 110, the particulate matter level is above a threshold at 120, the mileage 62 is above a threshold at 130, the PF inlet temperature 58 is above a threshold at 140, the particulate matter level is below a second threshold at 150, the mileage 62 is below a second threshold at 160, and the PF inlet temperature 58 and the PF outlet temperature 60 are within a range, the enable criteria for data collection have been met and the method proceeds to the data collection at 180 to 200.

If, however, the regeneration status 56 indicates that regeneration is complete at 110, the particulate matter level is above a threshold at 120, the mileage 62 is above a threshold at 130, the PF inlet temperature 58 is above a threshold at 140, and the particulate matter level is greater than or equal to the second threshold at 150 or the mileage 62 is greater than or equal to the second threshold at 160, the enable criteria for resistance evaluation have been met and the method proceeds to the resistance evaluation at 220 to 240.

If, however, the regeneration status 56 does not indicate that regeneration is complete at 110, the particulate matter level is less than a threshold at 120, the mileage 62 is less than a threshold at 130, the PF inlet temperature 58 is less than a threshold at 140, or the PF inlet temperature 58 and the PF outlet temperature 60 are outside of the range at 170, the enable criteria have not been met and the enable status is not enabled. The method may end at 210.

If the data collection is enabled, the flow range is evaluated at 180. If the exhaust flow 76 is within a flow range, the data depth and breadth 80 is recorded at 190 and the PF resistance 78 is computed based on the linear regression model 90 at 200. Thereafter, the method may end at 210. If, however, the exhaust flow 76 is outside of the flow range at 180, the method may end at 210.

If the resistance evaluation is enabled, the data depth and breadth 80 are evaluated at 220. If the data depth and breadth 80 are greater than or equal to a data threshold at 220, the PF resistance 78 is evaluated at 230. Otherwise, the method may end at 210.

If, at 230, the PF resistance 78 is greater than or equal to a resistance threshold, the PF is determined to be inefficient at 240 and the appropriate diagnostic measures are performed. If, however, the PF resistance 78 is less than the resistance threshold at 230, the method may end at 210.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of evaluating a particulate filter of an exhaust treatment system, comprising:
selectively enabling at least one of data collection and resistance evaluation based on a particulate matter level in the particulate filter;
when data collection is enabled, computing a particulate filter resistance based on a linear regression model; and
when resistance evaluation is enabled, evaluating an efficiency of the particulate filter based on the particulate filter resistance.

2. The method of claim 1 wherein the selectively enabling is further based on a regeneration status.

3. The method of claim 1 wherein the selectively enabling is further based on a particulate filter temperature.

4. The method of claim 1 wherein the evaluating the efficiency of the particulate filter is further based on a depth and breadth of collected data.

5. The method of claim 1 wherein the computing the particulate filter resistance is further based on exhaust pressure.

6. The method of claim 1 wherein the computing the particulate filter resistance is further based on exhaust flow.

7. The method of claim 1 wherein the linear regression model includes a linear regression transform function and a Kalman filter function.

8. An exhaust treatment control system, comprising:
a first module that selectively enables at least one of data collection and resistance evaluation based on a particulate matter level in the particulate filter;
a second module that when, data collection is enabled, computes a particulate filter resistance based on a linear regression model; and
a third module that, when resistance evaluation is enabled, evaluates an efficiency of the particulate filter based on the particulate filter resistance.

9. The system of claim 8 wherein the first module selectively enables the at least one of data collection and resistance evaluation based on a regeneration status.

10. The system of claim 8 wherein the first module selectively enables the at least one of data collection and resistance evaluation based on a particulate filter temperature.

11. The system of claim 8 wherein the third module evaluates the efficiency of the particulate filter based on a depth and breadth of collected data.

12. The system of claim 8 wherein the second module computes the particulate filter resistance based on exhaust pressure.

13. The system of claim 8 wherein the second module computes the particulate filter resistance based on exhaust flow.

14. The system of claim 8 wherein the linear regression model includes a linear regression transform function and a Kalman filter function.

15. A vehicle, comprising:
an engine;
a particulate filter that receives exhaust from the engine; and
a control module that selectively computes a particulate filter resistance based on a linear regression model, and that evaluates an efficiency of the particulate filter based on the particulate filter resistance.

16. The vehicle of claim 15 wherein the linear regression model includes a linear regression transform function and a Kalman filter function.

17. The vehicle of claim 15 wherein the control module computes the particulate filter resistance based on exhaust flow.

18. The vehicle of claim 15 wherein the control module computes the particulate filter resistance based on exhaust pressure.

19. The vehicle of claim 15 wherein the control module evaluates the efficiency of the particulate filter based on a depth and breadth of collected data.

20. The vehicle of claim 15 wherein the control module selectively computes the particulate filter resistance based on a regeneration status.

* * * * *